United States Patent [19]

Schuller et al.

[11] Patent Number: 4,632,625

[45] Date of Patent: Dec. 30, 1986

[54] AIRCRAFT-TOWING TRACTOR

[75] Inventors: Reinhard Schuller, Munich; Gerhard Koch, Neugermering, both of Fed. Rep. of Germany

[73] Assignee: Krauss-Maffei Aktiengesellschaft, Munich, Fed. Rep. of Germany

[21] Appl. No.: 611,405

[22] Filed: May 17, 1984

[30] Foreign Application Priority Data

May 18, 1983 [DE] Fed. Rep. of Germany ....... 3318077

[51] Int. Cl.[4] .......................... B60P 3/06; B62D 49/00; B64F 1/22
[52] U.S. Cl. .................................. 414/429; 180/24.01; 180/904
[58] Field of Search ................................ 414/426–430, 414/450; 280/113, 114; 180/904, 89.13, 24.01, 24.02

[56] References Cited

U.S. PATENT DOCUMENTS

| | | | |
|---|---|---|---|
| 2,240,723 | 5/1941 | Stoehr | 414/428 X |
| 2,874,861 | 2/1959 | Arnot | 414/428 |
| 2,919,043 | 12/1959 | Sharp | 414/428 X |
| 3,586,187 | 6/1971 | Wright | 414/428 |
| 3,598,259 | 8/1971 | Wright | 414/428 |
| 3,721,077 | 3/1973 | von der Lely | 180/89.13 X |
| 3,836,027 | 9/1974 | Gardner | 414/427 |
| 4,036,384 | 7/1977 | Johnson | 180/904 X |
| 4,113,041 | 9/1978 | Birkeholm | 180/904 X |
| 4,126,198 | 11/1978 | Martin | 180/89.13 X |
| 4,130,210 | 12/1978 | Purviance | 414/428 |
| 4,225,279 | 9/1980 | Boyer | 414/428 |
| 4,375,244 | 3/1983 | Morin | 414/429 X |
| 4,462,477 | 7/1984 | Mastro | 180/24.02 |

FOREIGN PATENT DOCUMENTS

| | | |
|---|---|---|
| 1007636 | 5/1957 | Fed. Rep. of Germany . |
| 1196514 | 7/1965 | Fed. Rep. of Germany . |
| 1430159 | 10/1968 | Fed. Rep. of Germany . |
| 2215771 | 10/1972 | Fed. Rep. of Germany . |
| 1949978 | 1/1977 | Fed. Rep. of Germany . |
| 2807729 | 9/1979 | Fed. Rep. of Germany . |
| 3014767 | 10/1980 | Fed. Rep. of Germany . |
| 3020823 | 12/1980 | Fed. Rep. of Germany . |
| 2452427 | 3/1979 | France . |

*Primary Examiner*—Joseph E. Valenza
*Assistant Examiner*—David A. Bucci
*Attorney, Agent, or Firm*—Karl F. Ross; Herbert Dubno

[57] ABSTRACT

The aircraft-towing tractor which comprises a rearwardly open fork within which a frame is mounted so as to be raised and lowered. Telescopingly extensible shanks of the frame reach rearwardly to carry gripper arms behind the nosewheel assembly of an aircraft so that the assembly is drawn into the opening of the fork and is retained thereagainst a front shoe. A retaining claw can be swung into place from above and the frame raised.

7 Claims, 6 Drawing Figures

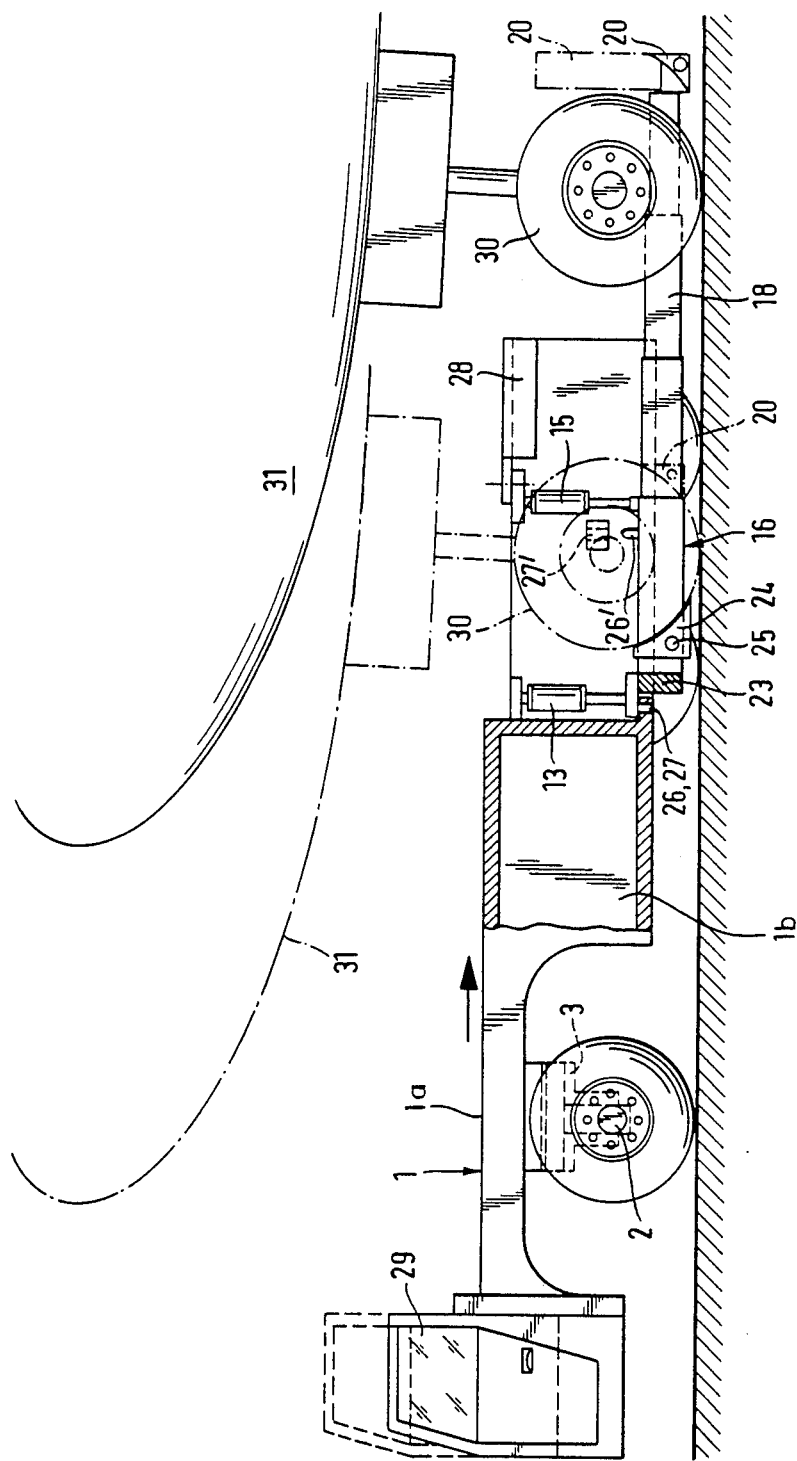

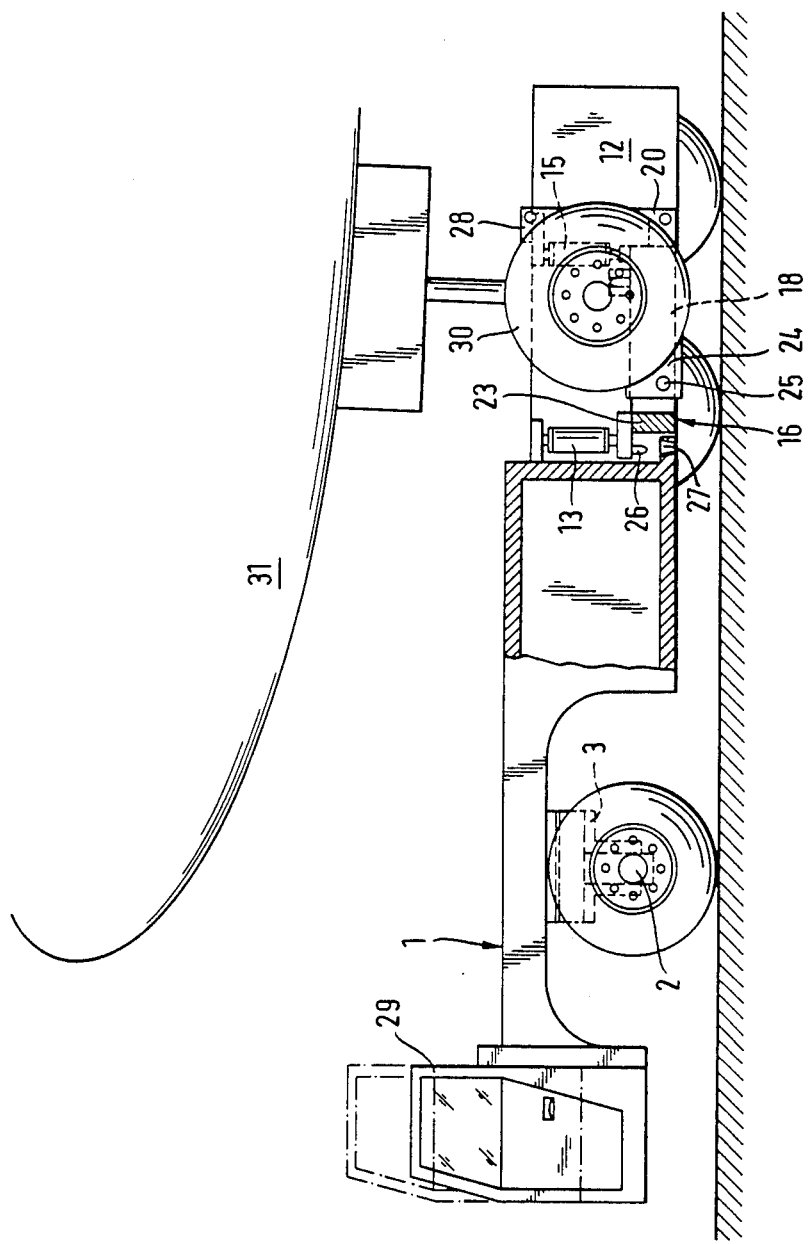

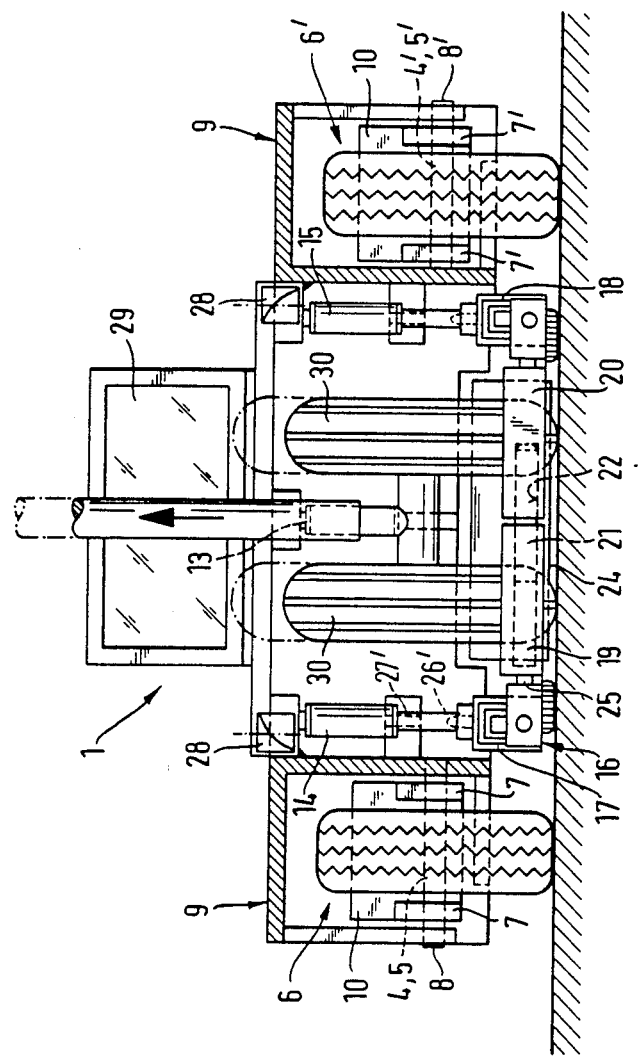

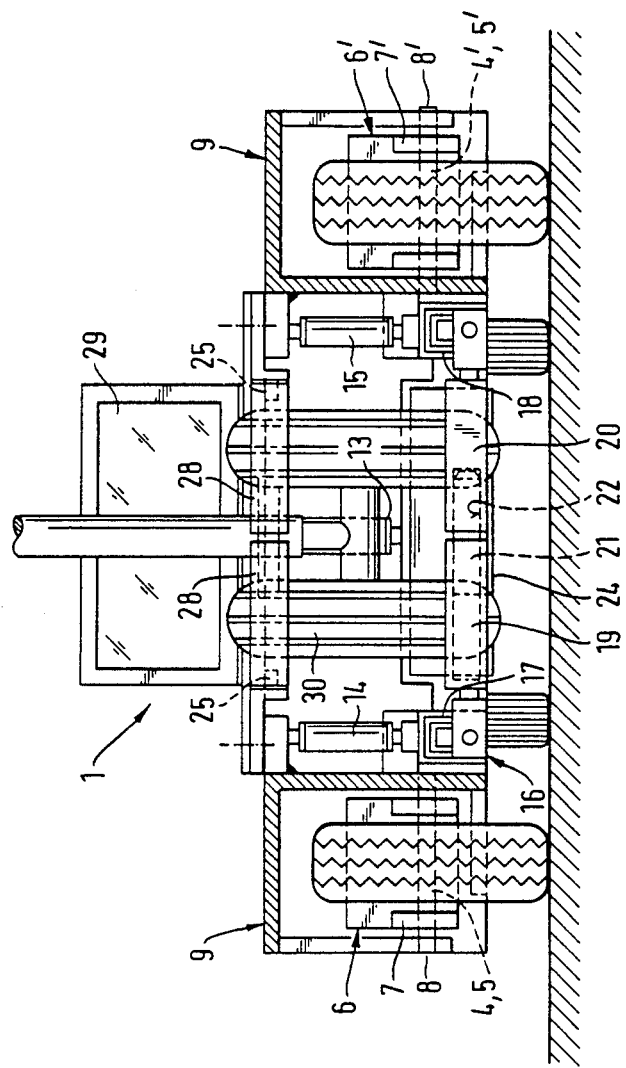

AIRCRAFT-TOWING TRACTOR

FIELD OF THE INVENTION

Our present invention relates to an aircraft tractor, and more particularly, to a towing vehicle for aircraft adapted to draw an aircraft along the ways of an airport or other facility and generally having between the rear wheels a fork-shaped structure provided with an opening in which the nosewheel of an aircraft is received.

BACKGROUND OF THE INVENTION

An aircraft tractor of such a construction is described in French printed application 2,452,427 (see FIG. 4) in which the fork within which the nosewheel of the aircraft is received is journaled on a lifting platform at the front end of the vehicle or tractor. The ramp on which the nosewheel is led into the recess of the fork is likewise pivotally mounted on this platform.

This construction has numerous disadvantages. For example, the pressing of the ramp by the wheel against the ground applies significant stress even at low speeds of the vehicle and can damage the ramp or the ground surface.

It is difficult to control the passage of the ramp below the nosewheel or the nosewheel onto the ramp and into the recess because the operations require high vehicle power, and control of the tractor during operations at such high power is difficult.

A further disadvantage is that during the pickup of the nosewheels by the ramp, a tilting moment can be applied to the vehicle which tends to lift the front wheels and interfere with control of the vehicle or require additional ballast and or a movement of the engine of the tractor forward.

OBJECTS OF THE INVENTION

It is the principal object of the present invention to provide an aircraft-towing tractor whereby the disadvantages outlined above are obviated.

Another object of this invention is to provide an improved aircraft-towing tractor of the type having a fork-shaped rear portion in which the nosewheels of the aircraft are to be received which has less tendency to relieve the front wheels of the tractor upon pickup of the aircraft and which is more easily controlled than prior aircraft tractors.

It is also an object of this invention to provide an aircraft-towing tractor whose engagement with the nosewheels of an aircraft is simplified so as to obviate the disadvantages of systems in which the ramp is thrust between the nosewheels and the ground.

SUMMARY OF THE INVENTION

These objects and others which will become apparent hereinafter are attained, in accordance with the invention, in an aircraft-towing tractor having front wheels and rear wheels on a tractor chassis, the rear wheels being mounted upon a fork-shaped frame element of the chassis with an upwardly and rearwardly open space in which the nosewheels of an aircraft are receivable.

According to the invention, a gripper is provided for engagement of the nosewheels of the aircraft and comprises gripper members which are displaceable proximal to the ground rearwardly from the fork-shaped frame element to reach behind the nosewheel, means on these members (e.g. gripper arms) swingable between an upright position allowing the gripper to clear the nosewheel into a lowered position to engage behind the nosewheel, and means for raising and lowering the members on the fork element. Consequently, the members, which can be telescoping shanks, each of which has a respective swingable element, can engage from opposite sides of the nosewheels behind the latter and draw the nosewheels into the fork-shaped element so that the nosewheels are retained preferably in a position such that their axis is located forwardly of an axis of the rear wheels of the tractor.

This wheel-engaging structure can be raised and lowered on the frame so that it can lift the nosewheels from the ground or lower the nosewheels into engagement with the ground.

It will be apparent that this system allows the tractor to be juxtaposed with the aircraft in a starting position with the nosewheels of the aircraft at a short distance from the rear of the tractor. The U-shaped frame then reaches rearwardly so that its members or shanks flank the nosewheels and the ends of these shanks reach behind the nosewheels. This frame can be maneuvered with the engine of the tractor substantially in an idling state, whereupon the grippers can be rotated to engage behind the nosewheels also utilizing the fine-control hydraulic mechanism of the tractor. Only as the gripper draws the nosewheel and the arms toward the tractor is a load applied and this, of course, does not require fine maneuverability, the load being significant only until the static inertia of the aircraft is broken and the latter caused to roll. Thereafter the load is minimal. The system of the invention can operate with the wheels of the aircraft in an unbraked condition to minimize the load.

As noted, in a preferred embodiment of the invention, the gripper unit comprises a U-shaped frame whose shanks or members are parallel to one another and to the sides of the fork and preferably are telescopically extendable by hydraulic means, although other mechanical means may be provided to extend these members. The telescoping extension of the members or shanks, therefore, may carry them rearwardly beyond the fork of the chassis so that their free ends carrying the gripper arms can engage behind the nosewheels.

The gripper arms at the free ends of these shanks or members can be rotated from their upright positions into horizontal positions to turn inwardly toward one another for engagement behind the nosewheels.

The U-shaped frame can be mounted in the fork of the chassis so as to be raised and lowered by hydraulic cylinders and the gripper unit and the lifting unit can be formed as a single apparatus readily detachable from the tractor as a unit for replacement, maintenance and repair.

The suspension of the U-shaped frame on variable-length hydraulic cylinder arrangements (jacks) and the provision of assorted measuring or signalling devices on alignment pins or elsewhere allows the tractor operator to know the position and orientation of the frame at all times, permits the frame to be oriented as may be required for engagement with the nosewheels even in unusual circumstances, e.g. when one or both of the tires has burst or flattened, and signals when the nosewheels are in position for lifting, etc. The frame can thus engage the nosewheel while they may be askew and by selective operation of the jacks can be utilized to properly position the nosewheel axis horizontally and at the requisite level.

According to a feature of the invention, one of the gripper arms can be provided with a locking bolt which in the horizontal positions of the two gripper arms can be shifted into a locking opening of the other gripper arms to thereby provide a highly stable structure behind the nosewheels.

As a result of this high stability afforded by the locking bolt which can be manually or hydraulically actuated, the spacing between the two shanks can be greater than might otherwise be the case, thereby facilitating maneuvering of the tractor and its gripper into position.

In order to retain the nosewheels in the tractor securely and reliably during the towing operation at the forward end of the space in which the nosewheels are received, a brakeshoe-shaped wedge member of ramp configuration can be provided against which the nosewheels are braced, this retaining shoe lying parallel to the gripper arms and to the traverse connecting the shanks of the U-frame. Naturally, the gripper arms can be similarly shaped, e.g. as wedges, ramps or brake shoes to ensure contoured embracing of the cylinders between the fixed shoes at the front of the space and the swingable shoes at the rear thereof.

According to yet another feature of the invention, the front and/or rear shoes may be provided with self-aligning means, e.g. in the form of pivots which enable them to grip the nosewheels securely, this also allows the structure to accommodate itself automatically to nosewheels of different diameters by the appropriate tilting of the shoes.

One or more retaining claws can be provided in the space receiving the nosewheels and can be pressed from above onto the nosewheels or the nosewheel carriage so that the nosewheel assembly is engaged in the vertical direction as well. The anchoring of the assembly in this manner has been found to be advantageous because vertical stresses are applied to the aircraft during the towing operation, e.g. because of wind factors or unevenness in the ground. The retaining claws can be ramp-shaped or shovel-shaped members also swiveably or tiltably mounted for automatic adjustment to wheels of different diameter.

According to yet another feature of the invention, the retaining claws are vertically adjustable so that the wheel assembly may be anchored at different levels in the aircraft. Such height adjustability is desirable or advantageous when the aircraft must be maneuvered with its flaps down or with its nosewheel doors in an open position and the doors may hang too low. The retaining claws can also be formed on the U-shaped frame with appropriate members for engagement with the wheels and jacks, or the like, and enabling the vertical positioning of this frame. Alternatively, the jack arrangement previously described can be used as the exclusive means for the vertical positioning of the nosewheels when the latter are in place.

According to yet another embodiment of the invention, only a single retaining claw is fixedly mounted on the U-shaped frame corresponding to the front retainer previously described and cannot be vertically adjusted. In this case, three-point retention of the nosewheel is ensured by reason of the engagement of the nosewheels between the upper and lower front retainers and the gripper behind the nosewheels.

The U-shaped frame pivotably connected to the hydraulic suspending jacks can be provided with self-centering locking or aligning units effective in the lowered and raised positions so that in the operating states in which high traction or pushing forces are generated, a secure and reliable retention of the gripper device in the tractor fork is ensured. These units can be provided with sensors for the purposes previously described and to signal excessive torsional, tranverse or longitudinal stress.

Advantageously, this locking system can include bolts with frustoconical ends formed on a U-shaped frame and which engage frustoconical recesses or openings in the chassis in a self-centering operation. The frustoconical configurations allow position irregularities to be rectified to the desired degree in both operative or stressed positions of the frame.

In the preferred construction of the tractor, the wheels of the rear axis form part of a tandem axle assembly, i.e. have two axles which are pivotably connected at a central location between them to the chassis. This allows the width of the tractor to be minimized even with high loading.

The tandem axle-bar can be extended forwardly and provided with a further hydraulic jack so as to enable one of the wheels to be lifted for increased maneuverability of the tractor on turns.

To avoid oscillation of the tandem axle bar, the extended end can also be provided with a shock or vibration damper to provide especially smooth operations.

To further improve the maneuverability, a hinged steering or universal steering is provided as part of the front wheel assembly (steering wheels rotatable through 360° about an axis or through 180° in either sense). The front axle can be journaled in a rotary frame for the latter purpose for precise maneuverability of the chassis into the starting position mentioned previously.

BRIEF DESCRIPTION OF THE DRAWING

The above and other objects, features and advantages of the present invention will become more readily apparent from the following description, reference being made to the accompanying drawing in which:

FIG. 3A is a section taken along the line III—III of FIG. 2 showing the gripper in position for engagement of the nosewheel and the nosewheels drawn into the chassis in dot-dash lines;

FIG. 3B is a view similar to FIG. 3A after the nosewheels have been lifted;

FIG. 4A is a rear view of the tractor after the nosewheels have been engaged by the gripper arms; and FIG. 4B is a rear view of the tractor after the nosewheels have been lifted and are in towing position.

SPECIFIC DESCRIPTION

Figure 1:
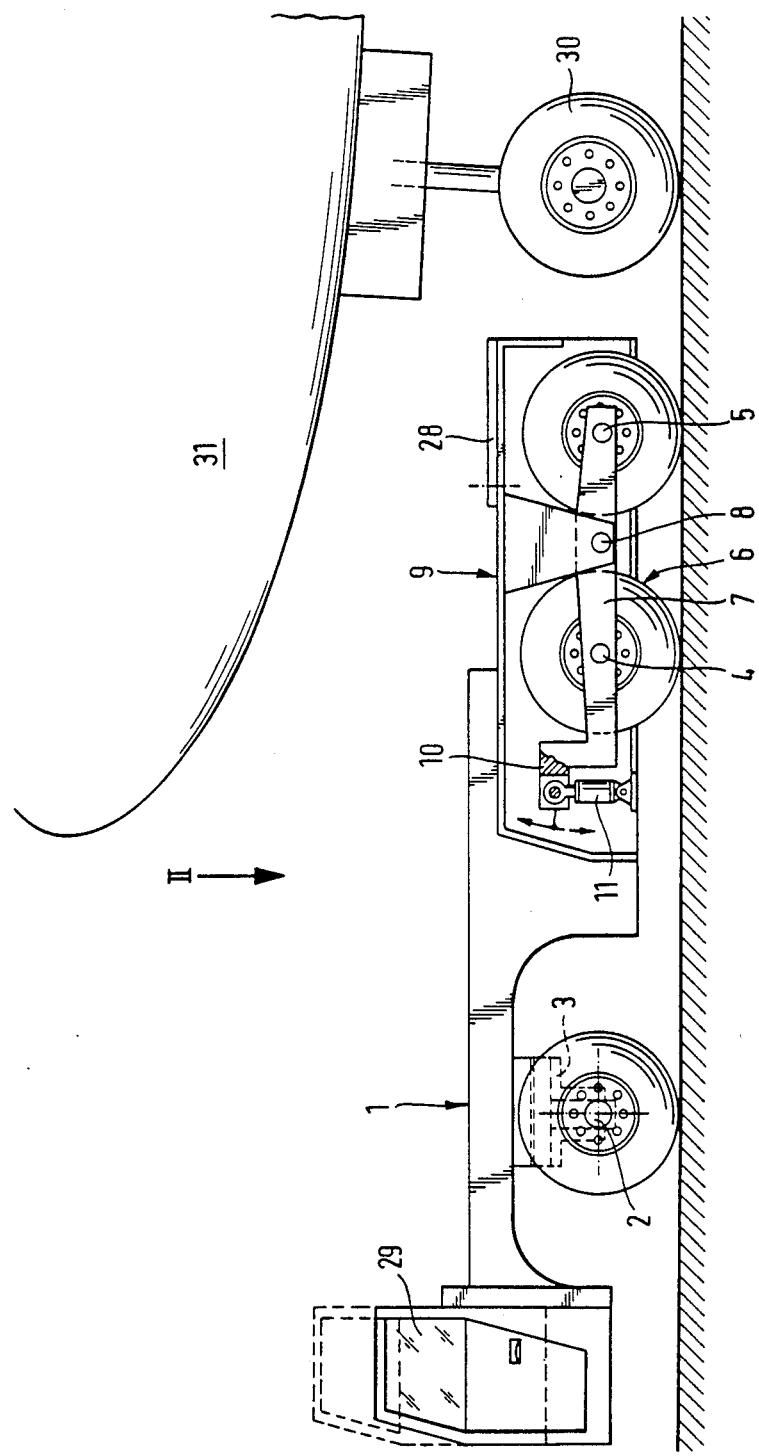
FIG. 1 is a side-elevational view, somewhat in diagrammatic form of a tractor according to the invention, in its starting position for engagement with the nosewheels of an aircraft which has been illustrated only in part.

The tractor 1 shown in drawing comprises a chassis 1a which may be provided with an engine compartment 1b (FIG. 3A), the output of which is connected to the rear driven wheels or to the front wheels by means not shown and which can be conventional in the art. These means may include hydraulic motors for each of the driven wheels which can be connected by hydraulic lines to a pump driven by a prime mover (not shown) in the engine compartment 1b.

The chassis 1a carries an operator cab 29 at its front end, a front wheel assembly represented at 2, which can be mounted on a turntable or turret 3 for rotation about a vertical or steering axis through 180° as represented by the arrow 3a in either sense (clockwise and counterclockwise) from the forward drive position. The frame also carries a pair of tandem axles 4 and 5 for each pair of rear wheels 4', 5' mounted on a double-beam arrangement 7 which in turn is mounted pivotally on its central axis 8 on the rear part or fork 9 of the chassis. Each of the separately controllable rear-wheel drives has been diagrammatically represented at 6 and 6' in FIG. 2.

Each of the double beams 7 and 7', only one of which is visible in FIG. 1, is extended forward at 10 and can be raised and lowered by a hydraulic jack 11 mounted on the respective portion of the chassis 9. This allows, for example, the front wheel of the two tandem rear wheels to be raised for greater steering maneuverability.

Between the parts of the fork-shaped rear 9 of the chassis, an opening 12 is provided (see FIG. 2) which is accessible from the rear and from above and below and in which the nosewheels 30 of the aircraft 31 can be received. According to the invention, this fork-opening 12 is provided with a U-shaped frame 16 suspended from hydraulic jacks 13, 14 and 15 from this fork portion 9 of the chassis. These jacks allow the frame 16 to be raised and lowered and form a three-point suspension for the frame 16 enabling it to be tilted as may be required about the longitudinal axis of the frame. The frame is best seen in FIGS. 2, 3A, 3B, 4A and 4B.

Figure 2:
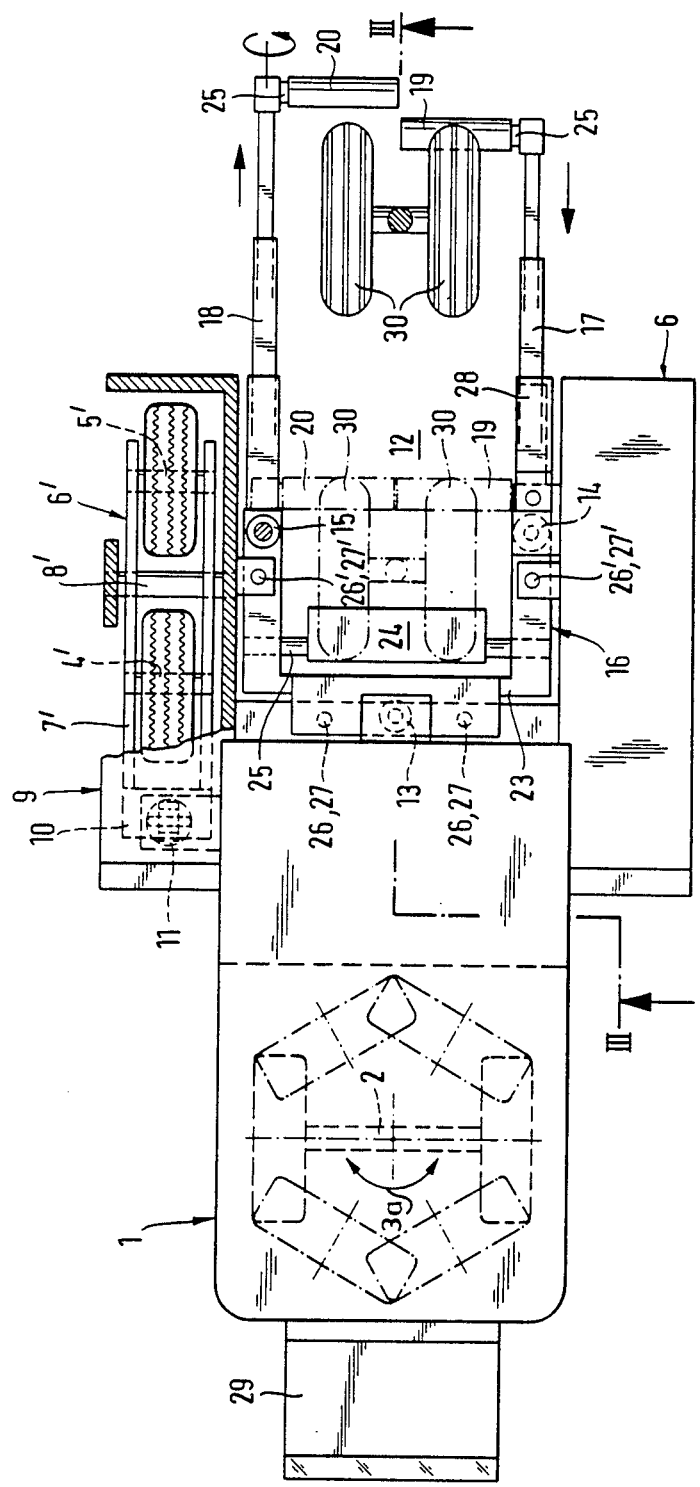
FIG. 2 is a view taken in the direction of arrow II of the tractor, partly broken away, and with a gripper shown to be drawing the nosewheels of the aircraft into the open rear of the chassis in the lower position and the gripper of the opposite side in its extended position prior to engagement with the nosewheels.

The U-shaped frame 16 has two parallel shanks or frame members represented at 17 and 18 which telescopically can extend rearward (see the two positions illustrated in FIG. 2).

At the free ends of the shanks 17 and 18 respective gripper arms 19 and 20 are swingable from their vertical orientations (dot-dash position of FIG. 3a) into horizontal positions (FIGS. 2, 4A and 4B) in which the free ends of these arms can register with one another and (see FIGS. 4A and 4B) a locking bolt 21 in the gripper arm 19 can be horizontally shifted into a locking opening formed in the gripper arm 20 (FIG. 4A) to ensure stable locking of the gripper arms in their horizontal positions behind the nosewheels 30. The gripper arms will generally move together on drawing the nosewheels into the opening 12 and thus the separation shown in FIG. 2 is only intended to illustrate the degree of mobility of the arms on the respective shanks 17 and 18.

The U-shaped frame 16 has its shanks connected by a transverse bar 23, parallel to which a wedge-shaped wheel-engaging ramp blade 24 is disposed pivotal on a pivot axle 25. The gripper arms 19 and 20 are similarly wedge-shaped pivotable ramp shoes or blades which self-adjust to wheels 30 of different diameter.

The U-shaped frame 16 in its lowered position, shown best in FIGS. 3a and 4a, can be locked relative to the fork portion 9 of the chassis by pins 26 which are frustoconical and therefore self-aligning and which engage in recesses 27 of the chassis part 9 (see FIG. 3b). Correspondingly, in the raised position of the frame 16, pins 26' which project upward therefrom engage in downwardly open alignment openings 27'. Retaining claws 28 which can be swung outwardly to liberate the wheels or inwardly to engage them, likewise are provided.

As is also apparent from FIG. 1, the cab 29 can be vertically adjusted to improve the visibility of the operator. This cab can be mounted to swing through 180° for greater maneuverability as well.

When the vehicle 1 is backed into position with its rear end slightly spaced from the nosewheels 30 of a aircraft (see FIG. 1), and with the frame 16 in its lower position (FIGS. 3A and 4A), the shanks 17 and 18 are extended rearward with the gripper arms 19 and 20 raised. The gripper arms are then rotated into their horizontal positions and locked together as has been described. In this state, the frame 16 is clearly held in its lower position by the pins 16 which engage the openings 27.

After the gripper arms have been locked together, the shanks 17 and 18 are telescopingly retracted so that the arms 19 and 20 draw the nosewheels 30 from behind into the space 12 and entrain the unbraked vehicle to the left until the nosewheels engage the shoe 24 as shown in dot-dash lines in FIG. 2.

The jacks 13, 14 and 15 then raise the frame 16 and lift the nose of the aircraft as shown in FIGS. 3B and 4B and the pins 26' engage in the registering openings 27' to stabilize the frame 16 with respect to the fork 9 of the chassis. In this upper position, the retaining claws 28 are swung inward to hold the wheel assembly 30 from above so that the wheel assembly is held in all directions.

The maneuverability of the tractor is improved when one of the tandem wheels is lifted. When the tandem assemblies are lowered so that both wheels engage the ground high traction forces can be applied to tow the aircraft.

We claim:
1. An aircraft-towing tractor comprising:
   an elongated tractor chassis displaceable along the ground and formed at a rear end with a fork element defining a rearwardly open fork opening;
   rear wheels flanking the opening of the tractor;
   a U-shaped frame disposed in said opening and having
      a pair of rearwardly extending parallel shanks telescopingly extendable out of said opening, each of said shanks having a gripper member swingably mounted on an end thereof for displacement between a raised position wherein said gripper members are generally parallel and spaced to clear a nosewheel assembly of an aircraft parked immediately behind the frame on extension of said shanks and an aligned position in which said gripper members are axially aligned with each other and can engage behind said assembly, and
      a transverse connecting bar bridging the shanks at a forward end of the frame and provided with a shoe parallel to the bar and engageable backwardly with the assembly;
   means for sequentially extending the shanks in the raised position of the gripper members to displace same backward past the assembly and for then rotating the arms into the aligned position with the assembly laterally flanked by the shanks and also behind the bar and ahead of the aligned gripper members;
   a pin extendable axially from one of the gripper members into the other gripper member in the aligned position of same to lock same together; and means for retracting the shanks with the gripper members in the aligned position and locked together by the pin for drawing the assembly engaged within the frame into said opening; and a shoe carried on the frame, extending parallel to said bar, and rearwardly engageable with said assembly upon the drawing of said assembly into said opening by said members.

2. The aircraft-towing tractor defined in claim 1 further including means mounted on said fork for raising said assembly which includes jacks for raising and lowering said frame on said fork.

3. The aircraft-towing tractor defined in claim 1 wherein said shoe is mounted so as to tilt about a pivot axis on said frame.

4. The aircraft-towing tractor defined in claim 3 wherein said members are generally wedge-shaped and form shoes engageable with said assembly.

5. The aircraft-towing tractor defined in claim 2, further comprising pin-and-hole locking means on said fork and said frame for retaining said frame stably against relative horizontal movement in upper and lower limiting positions of said frame on said fork.

6. The aircraft-towing tractor defined in claim 5 wherein said locking means includes frustoconical pins on said frame engageable in a self-centering manner in corresponding holes of said fork.

7. The aircraft-towing tractor defined in claim 2 wherein said chassis is provided at said fork with tandem rear wheels each mounted upon a double-beam centrally journalled on a respective side of said fork.

* * * * *